(12) United States Patent
Moskala et al.

(10) Patent No.: US 6,551,688 B2
(45) Date of Patent: Apr. 22, 2003

(54) CALENDERED POLYESTER FILMS OR SHEETS HAVING A HAZE VALUE OF LESS THAN FIVE PERCENT

(75) Inventors: Eric Jon Moskala, Kingsport, TN (US); Kevin Douglas Horton, Surgoinsville, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/795,800

(22) Filed: Feb. 28, 2001

(65) Prior Publication Data

US 2002/0188092 A1 Dec. 12, 2002

(51) Int. Cl.[7] .............................. B32B 3/10; B29C 49/08; C08G 63/02
(52) U.S. Cl. .................. 428/141; 528/298; 528/302; 528/307; 528/308; 528/308.6; 524/186; 524/270; 524/275; 524/284; 524/277; 524/773; 264/288.4; 264/292; 264/200; 264/300; 428/143; 428/147; 428/148
(58) Field of Search ............................... 528/302, 298, 528/307, 308, 308.6; 524/186, 270, 284, 275, 773, 277; 264/288.4, 292, 200, 300, 141; 428/143, 147, 148

(56) References Cited

U.S. PATENT DOCUMENTS

| | | | |
|---|---|---|---|
| 4,506,043 A | 3/1985 | Ogawa et al. | |
| 5,654,347 A | 8/1997 | Khemani et al. | |
| 5,696,176 A | 12/1997 | Khemani et al. | |
| 5,998,005 A | 12/1999 | Kanno | |
| 6,068,910 A | 5/2000 | Flynn et al. | |

FOREIGN PATENT DOCUMENTS

| | | |
|---|---|---|
| EP | 0 947 543 A | 10/1999 |
| JP | 00186191 A | 7/2000 |
| WO | WO 99 47605 A | 9/1999 |

*Primary Examiner*—Samuel A. Acquah
(74) *Attorney, Agent, or Firm*—B. J. Boshears; Bernie Graves

(57) ABSTRACT

A calendered film or sheet of a polyester resin composition has a haze value of less than 5 percent. The polyester resin composition comprises a polyester having a crystallization half-time from a molten state of at least 5 minutes and an additive comprising (i) a fatty acid or a salt of a fatty acid containing more than 18 carbon atoms and (ii) an ester wax comprising a fatty acid containing more than 18 carbon atoms with an alcohol containing from 2 to 28 carbon atoms, wherein the ratio of the fatty acid or salt of the fatty acid to the ester wax is 1:1 or greater. Also, the present invention is a process for producing such calendered film or sheet having a haze value of less than 5 percent. The steps of the process comprise (1) calendering such polyester resin composition, (2) forming on a calendering roll a film or sheet from such polyester resin composition, and (3) removing the film or sheet from the calendering roll at an angle of less than 90° to form a film or sheet having a haze value of less than 5 percent.

30 Claims, 1 Drawing Sheet

CALENDERED POLYESTER FILMS OR SHEETS HAVING A HAZE VALUE OF LESS THAN FIVE PERCENT

TECHNICAL FIELD OF THE INVENTION

This invention relates to polyester film or sheet that is produced by calendering, and more particularly, to the calendered polyester film or sheet that has a haze value of less than 5 percent.

BACKGROUND OF THE INVENTION

Calendering is an economic and highly efficient means to produce film and sheet from plastics. Polyvinyl chloride (PVC) resins are by far the largest segment of the calendered film and sheet business, although small amounts of other thermoplastic polymers such as polypropylene, acrylonitrile/butadiene/styrene terpolymers, and chlorinated polyethylene are also processed by calendering methods.

U.S. Pat. No. 6,068,910 discloses that amorphous polyesters and copolyester compositions with crystallization half-times from a molten state of at least 5 minutes may be calendered if an additive for preventing sticking to the calendering rolls is blended with the resin. Examples of such additives include fatty acid amides, metal salts of organic acids, fatty acids and esters, hydrocarbon waxes, polyethylene waxes, chemically modified polyolefin waxes, and ester waxes.

U.S. Pat. No. 5,998,005 also discloses that particular copolyester resins can be calendered if a fatty acid ester lubricant such as stearic acid monoglyceride, a montanic acid ester, or a montanic acid ester partially saponified with calcium, is added to the resin. The particular copolyester resin is obtained by replacing in the production of polyethylene terephthalate (PET) resin 10 to 40 mole % of the ethylene glycol component with 1,4-cyclohexanedimethanol. The invention also teaches that the copolyester resins may comprise, in addition to the copolyester and fatty acid ester lubricant, another lubricant such as a fatty acid, a fatty acid amide, a fatty acid bisamide, or a fatty acid ketone.

Calenderable compositions of amorphous PET using phosphate esters and/or fatty acid ester release agents are disclosed in Japan Unexamined Patent Publication 2000-186,191A. The haze of calendered sheet made from such compositions was measured to be less than 40% according to JIS K 7105 Standard Test Method for Haze.

U.S. Pat. Nos. 6,068,910 and 5,998,005 do not report quantitative values for haze in the calendered polyester sheets. U.S. Pat. No. 5,998,005 does disclose that transparency is good with the preferred release agent. In many applications involving film and sheet of amorphous polyesters, 40% haze and even good clarity are insufficient.

Thus, there exists a need in the art for a polyester composition that when utilized in the calendering process exhibits good release from the calendering rolls and displays excellent clarity in the final sheet or film product. Accordingly, it is to the provision of such that the present invention is primarily directed.

SUMMARY OF THE INVENTION

A calendered film or sheet of a polyester resin composition has a haze value of less than 5 percent. The polyester resin composition comprises a polyester having a crystallization half-time from a molten state of at least 5 minutes and an additive comprising (i) a fatty acid or a salt of a fatty acid containing more than 18 carbon atoms and (ii) an ester wax comprising a fatty acid containing more than 18 carbon atoms with an alcohol containing from 2 to 28 carbon atoms, wherein the ratio of the fatty acid or salt of the fatty acid to the ester wax is 1:1 or greater. Also, the present invention is a process for producing such calendered film or sheet having a haze value of less than 5 percent. The steps of the process comprise (1) calendering such polyester resin composition, (2) forming on a calendering roll a film or sheet from such polyester resin composition, and (3) removing the film or sheet from the calendering roll at an angle of less than 90° to form a film or sheet having a haze value of less than 5 percent.

DETAILED DESCRIPTION OF THE INVENTION

Figure 1:
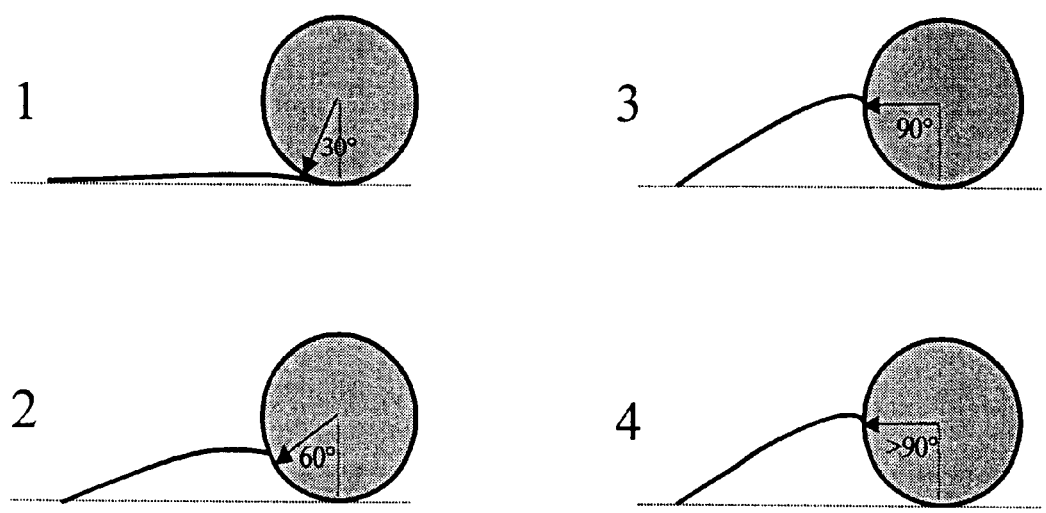
FIG. 1 is an illustration of the scale used to characterize the level of release of a film or sheet from calendaring rolls.

Certain amorphous or semi-crystalline polyester resin compositions are unexpectedly capable of being calendered using conventional calendering processes to produce films and sheets with less than five percent haze as measured according to ASTM D1003 and sufficient release from calendaring rolls. The polyester resin composition comprises a polyester having a crystallization half-time from a molten state of at least 5 minutes and an additive comprising a fatty acid or salt of a fatty acid and an ester wax. The fatty acid, the salt of the fatty acid, and the fatty acid of the ester wax must each contain more than 18 carbon atoms. The alcohol of the ester wax contains from 2 to 28 carbon atoms. The ratio of the fatty acid or salt of the fatty acid to the ester wax must be 1:1 or greater.

While the individual components of the additive have been disclosed in the art to prevent sticking of polyester resin composition to calendering rolls, the combination of the particular components and the ratio at which they are combined give unexpected benefits in providing both good release and low haze. The additives with fatty acid components containing 18 or less carbon atoms have a lower molecular weight and, thus, become miscible with the polyester. The miscible additives have less interfacial migration surface qualities resulting in poor release or an increase in haze. When the polyester resin composition contains more ester wax relative to the fatty acid, the haze value exceed five percent as shown in Examples 1 to 6.

The additive is preferably present from about 0.1 to about 10 weight percent, based on the total weight percent of the polyester. More, preferably, the additive is present from about 0.1 to about 2 weight percent.

The fatty acid suitable for use in the present invention is preferably montanic acid. The salt of fatty acid is preferably the sodium, calcium, or lithium salt of montanic acid.

The ester wax suitable for use in the present invention is preferably an ester wax of montanic acid with the alcohol portion of the ester wax being montanyl alcohol, ethylene glycol, butylene glycol, glycerol, or pentaerythritol. The ester wax may also contain adipic acid. Partially saponified versions of these ester waxes are also suitable for use in the present invention.

The ratio of the fatty acid or salt of the fatty acid to the ester wax is preferably 2:1 or greater.

Preferably, the polyester has a crystallization half-time from a molten state of at least 12 minutes. The term "polyesters" as used herein is meant to include copolyesters. Amorphous polyesters are preferred because of their having a crystallization half time of infinity. Desired crystallization kinetics from the melt may also be achieved by adding polymeric additives or by altering the molecular weight characteristics of the polymer. An especially useful technique is to blend amorphous or very slow crystallizing polyester with the base polyester.

Crystallization half times as defined by the present invention are measured using a Perkin-Elmer Model DSC-2 differential scanning calorimeter. Each sample of 15.0 mg is sealed in an aluminum pan and heated to 290° C. at a rate of about 320° C./min for 2 minutes. The sample is then cooled immediately to the predetermined isothermal crystallization temperature at a rate of about 320° C./minute in the presence of helium. The crystallization half time is determined as the time span from reaching the isothermal crystallization temperature to the point of a crystallization peak on the DSC curve.

More preferably, the polyester comprises (i) at least 80 mole percent of a diacid residue component selected from terephthalic acid, naphthalenedicarboxylic acid, 1,4-cyclohexanedicarboxylic acid, isophthalic acid and mixtures thereof and (ii) at least 80 mole percent of a diol residue component selected from diols containing 2 to about 10 carbon atoms and mixtures thereof, wherein the diacid residue component is based on 100 mole percent and the diol residue component is based on 100 mole percent.

For the diacid residue component, any of the various isomers of naphthalenedicarboxylic acid or mixtures of isomers may be used, but the 1,4, 1,5-, 2,6-, and 2,7-isomers are preferred. Also, cis, trans, or cis/trans isomer mixtures of 1,4-cyclohexanedicarboxylic acid may be used. Sulfoisophthalic acid may also be used. The diacid residue component may be modified with minor amounts of up to about 20 mole percent of other diacids containing about 4 to about 40 carbon atoms and include succinic acid, glutaric acid, azelaic acid, adipic acid, suberic acid, sebacic acid, dimer acid and the like.

For the diol residue component, the preferred diols include ethylene glycol, diethylene glycol, neopentyl glycol, 1,4-cyclohexanedimethanol and mixtures thereof. More preferably, the diol residue component is from about 10 to 100 mole percent 1,4-cyclohexanedimethanol and from about 90 to 0 mole percent ethylene glycol. The diol residue component may also be modified with up to about 20 mole percent of other diols. Suitable modifying diols include 1,3-propanediol, 1,4-butanediol, 1,5-pentanediol, 1,6-hexanediol, 1,8-octanediol, 2,2,4-trimethyl-1,3-pentanediol, propylene glycol, 2,2,4,4-tetramethyl-1,3-cyclobutanediol and the like.

Even more preferably, the polyester comprises (i) at least 90 mole percent of a diacid residue component of terephthalic acid and (ii) a diol residue component comprising about 10 to about 40 mole percent 1,4-cyclohexanedimethanol and about 60 to 90 mole percent ethylene glycol.

The inherent viscosity (I.V.) of useful polyesters generally range from about 0.4 to about 1.5 dL/g, preferably about 0.6 to about 1.2 dL/g. I.V. as used herein refers to inherent viscosity determinations made at 25° C. using 0.25 gram of polymer per 100 mL of a solvent composed of 60 weight percent phenol and 40 weight percent tetrachloroethane.

The amorphous polyesters are made by melt phase techniques well known in the art. The semicrystalline polyesters may be made by a combination of melt phase and solid phase poly-condensation procedures also well known in the art.

Conventional oxidative stabilizers may also be used with polyesters of the present invention to prevent oxidative degradation during processing of the molten or semi-molten material on the rolls. Suitable stabilizers include esters such as distearyl thiodipropionate or dilauryl thiodipropionate; phenolic stabilizers such as IRGANOX 1010 available from Ciba-Geigy AG, ETHANOX 330 available from Ethyl Corporation, and butylated hydroxytoluene; and phosphorus containing stabilizers such as IRGAFOS available from Ciba-Geigy AG and WESTON stabilizers available from GE Specialty Chemicals. These stabilizers may be used alone or in combinations.

Sometimes the melt viscosity and the melt strength of the polyester are insufficient for suitable processing on the calendering equipment. In these cases, the use of a melt strength enhancer is desirable such as by the addition of small amounts (about 0.1 to about 2.0 mole %) of a branching agent to the polyesters either during their initial preparation or during subsequent blending or feeding procedures prior to reaching the calendering equipment. Suitable branching agents include multifunctional acids or glycols such as trimellitic acid, trimellitic anhydride, pyromellitic dianhydride, trimethylolpropane, glycerol, pentaerythritol, citric acid, tartaric acid, 3-hydroxyglutaric acid and the like. These branching agents may be added directly to the polyester or blended with the polyester in the form of a concentrate as described in U.S. Pat. Nos. 5,654,347 and 5,696,176. It is also possible to use agents such as sulfoisophthalic acid to increase the melt strength of the polyester to a desirable level.

In addition to the additives described above, other additives typically used with polymers may be used as desired. These include plasticizers, dyes, colorants, pigments, fillers, matting agents, antiblocking agents, antistatic agents, chopped fibers, glass, impact modifiers, flame retardants, carbon black, talc, $TiO_2$ and the like.

In another embodiment of the present invention, a process for producing a calendered film or sheet having a haze value of less than 5 percent comprises the steps of:

(1) calendering a polyester resin composition comprising:

(a) a polyester having a crystallization half-time from a molten state of at least 5 minutes, (b) an additive comprising a fatty acid or a salt of a fatty acid containing more than 18 carbon atoms and an ester wax comprising a fatty acid containing more than 18 carbon atoms with an alcohol containing from 2 to 28 carbon atoms, wherein the ratio of the fatty acid or salt of the fatty acid to the ester wax is 1:1 or greater, (2) forming on a calendering roll a film or sheet from the polyester resin composition, and (3) removing the film or sheet from the calendering roll at an angle of less than 90° to form a film or sheet having a haze value of less than 5 percent.

Conventional calendering processes and equipment are utilized to calender the polyester resin composition. Calenders having at least two adjacent heated rolls are suitable for processing the polyester resin composition, which is introduced between the two rolls in pellet, powder or molten form. The rolls may be in series or have a "L", an inverted "L", or a "Z" configuration. Typical processing temperatures for the rolls will generally range from about 130° C. to about 250° C., preferably about 140° C. to about 190° C. Predrying the polyester resin composition or venting excess moisture during processing is preferred to prevent polymer degradation by hydrolysis.

This invention can be further illustrated by the following examples of preferred embodiments thereof, although it will be understood that these examples are included merely for purposes of illustration and are not intended to limit the scope of the invention unless otherwise specifically indicated.

EXAMPLES 1–6

Polyester resin compositions comprising a polyester containing an acid component of 100 mole % terephthalic acid and a glycol component of 31 mole % 1,4-cyclohexanedimethanol and 69 mole % ethylene glycol and additives as listed in Table 1 were processed on a Farrell two-roll mill at a set roll temperature of 165° C. for 8 minutes and then calendered into films having a thickness of 0.040 inches (1.0 mm).

The release of the film from the calendering rolls was quantified according to the scale described in FIG. 1. The film was gripped and pulled from the roll so that the position of the gripped end of the film corresponds to the bottom of the roll. Four categories of release were defined according to the approximate angle at which the film released from the roll as described in FIG. 1. If the angle was greater than 90 degrees, the film could not be removed from the roll as a uniform and coherent material.

Percent haze of the film was measured according to ASTM D1003 Standard Test Method for Haze and Luminous Transmittance of Transparent Plastics. If the release value was four, the film could not be obtained and consequently no haze measurement was made.

TABLE 1

| Examples | 1 | 2 | 3 | 4 | 5 | 6 |
|---|---|---|---|---|---|---|
| Polyester (wt. %) | 99.5 | 99.5 | 99.5 | 99.5 | 99.5 | 99.5 |
| Licowax S[1] (wt. %) | 0.35 | 0.35 | 0.35 | | 0.25 | 0.15 |
| Licowax OP[2] (wt. %) | 0.15 | | | 0.15 | 0.25 | 0.35 |
| Licolub WE4[3] (wt. %) | | 0.15 | | | | |
| Licolub WE40[4] (wt. %) | | | 0.15 | | | |
| Licomont NaV101[5] (wt. %) | | | | 0.35 | | |
| Release Value | 2 | 2 | 2 | 2 | 2 | 2 |
| % Haze | 2.53 | 3.56 | 1.53 | 3.68 | 4.88 | 9.24 |

[1]Licowax S is a montanic acid available from Clariant Corporation.
[2]Licowax OP is a butylene glycol ester of montanic acid that has been partially saponified with calcium hydroxide available from Clariant Corporation.
[3]Licolub WE4 is a glycerol ester of montanic acid available from Clariant Corporation.
[4]Licolub WE40 is a pentaerythritol ester of montanic acid containing adipic acid available from Clariant Corporation.
[5]Licomont NaV101 is the sodium salt of montanic acid available from Clariant Corporation.

Examples 1–5 demonstrate that amorphous polyester compositions containing a mixture of a fatty acid or salt of a fatty acid with an ester wax at a 1:1 or greater ratio, respectively, exhibit good release from calendering rolls, as defined by a release value of 2, and less than 5% haze in the final sheet product.

COMPARATIVE EXAMPLES 1–8

Polyester resin compositions containing a single additive in the form of an ester wax, a fatty acid, or a salt of a fatty acid as listed in Table 2 were prepared according to the manner described for Examples 1–6.

TABLE 2

| Comparative Examples | 1 | 2 | 3 | 4 | 5 | 6 | 7 | 8 |
|---|---|---|---|---|---|---|---|---|
| Polyester (wt. %) | 99.5 | 99.65 | 99.65 | 99.65 | 99.5 | 99.3 | 99.5 | 99.5 |
| Licowax OP (wt. %) | 0.5 | 0.35 | | | | | | |
| Licolub WE4 (wt. %) | | | 0.35 | | | | | |
| Licolub WE40 (wt. %) | | | | 0.35 | | | | |
| Licowax S (wt. %) | | | | | 0.5 | 0.7 | | |
| Licomont NaV101 (wt. %) | | | | | | | 0.5 | |
| Licomont CaV102[1] (wt. %) | | | | | | | | 0.5 |
| Release Value | 2 | 4 | 3 | 2 | 4 | 2 | 3 | 4 |
| % Haze | 7.95 | — | 3.87 | 6.02 | — | 7.95 | 4.88 | — |

[1]Licomont CaV102 is the calcium salt of montanic acid available from Clariant Corporation.

Comparative Examples 1–8 demonstrate that amorphous polyester compositions containing a single ester wax, a fatty acid, or salt of a fatty acid do not exhibit both good release and less than 5% haze.

COMPARATIVE EXAMPLES 9–12

Polyester resin compositions containing mixtures of an ester wax with a fatty acid, or a salt of a fatty acid, as listed in Table 2 were prepared according to the manner described for Examples 1–6.

TABLE 3

| Comparative Examples | 1 | 2 | 3 | 4 |
|---|---|---|---|---|
| Polyester (wt. %) | 99.5 | 99.5 | 99.5 | 99.5 |
| Stearic Acid (wt. %) | 0.35 | 0.35 | 0.35 | |
| Licowax OP (wt. %) | 0.15 | | | 0.15 |
| Licolub WE4 (wt. %) | | 0.15 | | |
| Licolub WE40 (wt. %) | | | 0.15 | |
| Calcium Stearate (wt. %) | | | | 0.35 |
| Release Value | 4 | 4 | 4 | 4 |
| % Haze | — | — | — | — |

Comparative examples 9–12 demonstrate that polyester resin compositions containing an ester wax and a fatty acid or salt of a fatty acid containing 18 carbons exhibit poor release (a release value of 4).

What is claimed is:

1. A calendered film or sheet having a haze value of less than 5 percent as measured according to ASTM D1003 and comprising a polyester resin composition comprising:
   (a) a polyester having a crystallization half-time from a molten state of at least 5 minutes,
   (b) an additive comprising (i) a fatty acid or a salt of a fatty acid containing more than 18 carbon atoms and (ii) an ester wax comprising a fatty acid containing more than 18 carbon atoms with an alcohol containing from 2 to 28 carbon atoms, wherein the ratio of the fatty acid or salt of the fatty acid to the ester wax is 1:1 or greater.

2. The calendered film or sheet of claim 1 wherein the polyester has a crystallization half-time from a molten state of at least 12 minutes.

3. The calendered film or sheet of claim 1 wherein the polyester comprises (i) at least 80 mole percent of a diacid residue component selected from terephthalic acid, naphthalenedicarboxylic acid, 1,4-cyclohexanedicarboxylic acid, isophthalic acid and mixtures thereof and (ii) at least 80 mole percent of a diol residue component selected from diols containing 2 to about 10 carbon atoms and mixtures thereof, wherein the diacid residue component is based on 100 mole percent and the diol residue component is based on 100 mole percent.

4. The calendered film or sheet of claim 3 wherein the polyester comprises (i) at least 90 mole percent of a diacid residue component of terephthalic acid and (ii) a diol residue component comprising about 10 to about 40 mole percent 1,4-cyclohexanedimethanol and about 60 to 90 mole percent ethylene glycol.

5. The calendered film or sheet of claim 1 wherein the additive is present from about 0.1 to about 10 weight percent, wherein the weight percent of the additive is based on the total weight percent of the polyester.

6. The calendered film or sheet of claim 5 wherein the additive is present from about 0.1 to about 2 weight percent.

7. The calendered film or sheet of claim 1 wherein the fatty acid is montanic acid.

8. The calendered film or sheet of claim 1 wherein the salt of the fatty acid is selected from the group consisting of sodium salt of montanic acid, calcium salt of montanic acid, and lithium salt of montanic acid.

9. The calendered film or sheet of claim 1 wherein the fatty acid of the ester wax is montanic acid.

10. The calendered film or sheet of claim 9 wherein the alcohol of the ester wax is selected from the group consisting of montanyl alcohol, ethylene glycol, butylene glycol, glycerol and pentaerythritol.

11. The calendered film or sheet of claim 1 wherein the additive comprises montanic acid and a butylene glycol ester of montanic acid.

12. The calendered film or sheet of claim 11 wherein the butylene glycol ester of montanic acid has been partially saponified with calcium hydroxide.

13. The calendered film or sheet of claim 1 wherein the additive comprises montanic acid and a glycerol ester of montanic acid.

14. The calendered film or sheet of claim 1 wherein the additive comprises montanic acid and a pentaerythritol ester of montanic acid.

15. The calendered film or sheet of claim 14 wherein the pentaerythritol ester of montanic acid further comprises adipic acid.

16. The calendered film or sheet of claim 1 wherein the additive comprises a salt of montanic acid and a butylene glycol ester of montanic acid.

17. The calendered film or sheet of claim 16 wherein the butylene glycol ester of montanic acid has been partially saponified with calcium hydroxide.

18. The calendered film or sheet of claim 1 wherein the additive comprises a salt of montanic acid and a glycerol ester of montanic acid.

19. The calendered film or sheet of claim 1 wherein the additive comprises a salt of montanic acid and a pentaerythritol ester of montanic acid.

20. The calendered film or sheet of claim 19 wherein the pentaerythritol ester of montanic acid further comprises adipic acid.

21. The calendered film or sheet of claim 1 wherein the ratio is 2:1 or greater.

22. A calendered film or sheet having a haze value of less than 5 percent and comprising a polyester resin composition comprising:

(a) a polyester comprising (i) at least 90 mole percent of a diacid residue component of terephthalic acid and (ii) a diol residue component comprising about 10 to about 40 mole percent 1,4-cyclohexanedimethanol and about 60 to 90 mole percent ethylene glycol, (b) from about 0.1 to about 2 weight percent of an additive comprising (i) montanic acid or a salt of montanic acid and (ii) an ester wax of montanic acid containing montanyl alcohol, ethylene glycol, butylene glycol, glycerol and pentaerythritol, wherein the ratio of the montanic acid or salt of montanic acid to the ester wax is 1:1 or greater;

wherein the weight percent of the additive is based on the total weight percent of the polyester resin composition.

23. A film or sheet made by a process comprising the step of calendering a polyester resin composition comprising (a) a polyester having a crystallization half-time from a molten state of at least 5 minutes, (b) an additive comprising a fatty acid or a salt of a fatty acid containing more than 18 carbon atoms and an ester wax comprising a fatty acid containing more than 18 carbon atoms with an alcohol containing from 2 to 28 carbon atoms, wherein the ratio of the fatty acid or salt of the fatty acid to the ester wax is 1:1 or greater;

wherein the film or sheet has a haze value of less than 5 percent.

24. A process for producing a calendered film or sheet having a haze value of less than 5 percent comprising the steps of:

(1) calendering a polyester resin composition comprising:

(a) a polyester having a crystallization half-time from a molten state of at least 5 minutes, (b) an additive comprising a fatty acid or a salt of a fatty acid containing more than 18 carbon atoms and an ester wax comprising a fatty acid containing more than 18 carbon atoms with an alcohol containing from 2 to 28 carbon atoms, wherein the ratio of the fatty acid or salt of the fatty acid to the ester wax is 1:1 or greater, (2) forming on a calendering roll a film or sheet from the polyester resin composition, and (3) removing the film or sheet from the calendering roll at an angle of less than 90° to form a film or sheet having a haze value of less than 5 percent.

25. The process of claim 24 wherein the polyester has a crystallization half-time from a molten state of at least 12 minutes.

26. The process of claim 24 wherein the polyester comprises (i) at least 90 mole percent of a diacid residue component of terephthalic acid and (ii) a diol residue component comprising about 10 to about 40 mole percent 1,4-cyclohexanedimethanol and about 60 to 90 mole percent ethylene glycol.

27. The process of claim 24 wherein the additive is present from about 0.1 to about 10 weight percent, wherein the weight percent of the additive is based on the total weight percent of the polyester.

28. The process of claim 27 wherein the additive is present from about 0.1 to about 2 weight percent.

29. The process of claim 24 wherein the ratio is 2:1 or greater.

30. The process of claim 24 wherein the additive comprises montanic acid or a salt of montanic acid and an ester wax of montanic acid containing montanyl alcohol, ethylene glycol, butylene glycol, glycerol and pentaerythritol.

* * * * *